United States Patent
Robertson et al.

(12) 
(10) Patent No.: US 6,325,466 B1
(45) Date of Patent: Dec. 4, 2001

(54) DEVICE FOR ACTIVATING TRAILER ELECTRIC WHEEL BRAKES

(75) Inventors: Charles L. Robertson, Horton, AL (US); Michael A. Hedding, Brighton, MI (US)

(73) Assignee: Hayes Lemmerz International, Inc., Romulus, MI (US)

(*) Notice: Subject to any disclaimer, the term of this patent is extended or adjusted under 35 U.S.C. 154(b) by 0 days.

(21) Appl. No.: 09/302,813

(22) Filed: Apr. 30, 1999

(51) Int. Cl.[7] .................................................. B60T 13/66
(52) U.S. Cl. ................................ 303/20; 303/7; 303/124
(58) Field of Search .................................. 303/7, 20, 123, 303/124, 122.04, 122.05; 188/112 R (56) References Cited

U.S. PATENT DOCUMENTS

| | | |
|---|---|---|
| 3,738,710 | 6/1973 | Pokriachak et al. . |
| 3,771,840 * | 11/1973 | Hubbard ................................ 180/82 |
| 3,780,832 * | 12/1973 | Marshall .............................. 188/3 R |
| 3,819,234 * | 6/1974 | Couchois et al. ...................... 303/20 |
| 4,084,859 * | 4/1978 | Bull et al. ............................ 303/106 |
| 4,398,252 | 8/1983 | Frait . |
| 4,524,312 * | 6/1985 | Matsumoto et al. .................. 318/481 |
| 4,721,344 | 1/1988 | Frait et al. . |
| 4,726,627 * | 2/1988 | Frait et al. .......................... 303/24 R |
| 4,856,850 * | 8/1989 | Aichele et al. ......................... 303/20 |
| 5,050,937 | 9/1991 | Eccleston . |
| 5,149,176 | 9/1992 | Eccleston . |
| 5,352,028 | 10/1994 | Eccleston . |
| 5,615,930 | 4/1997 | McGrath et al. . |
| 5,620,236 | 4/1997 | McGrath et al. . |
| 5,741,048 * | 4/1998 | Eccleston ................................ 303/7 |
| 5,782,542 * | 7/1998 | McGarth et al. ........................ 303/7 |
| 5,800,025 * | 9/1998 | McGrath et al. ........................ 303/7 |
| 5,949,147 * | 9/1999 | McGrath et al. ..................... 303/10.1 |
| 6,039,410 * | 3/2000 | Robertson et al. ...................... 303/7 |
| 6,068,352 * | 5/2000 | Kulkarni et al. ....................... 303/20 |

\* cited by examiner

*Primary Examiner*—Robert J. Oberleitner
*Assistant Examiner*—Bradley King
(74) *Attorney, Agent, or Firm*—MacMillan, Sobanski & Todd, LLC (57) ABSTRACT

An electric trailer brake control device includes a delay circuit to prevent actuation of the trailer brakes when the towing vehicle hazard flasher is actuated.

8 Claims, 8 Drawing Sheets

DEVICE FOR ACTIVATING TRAILER ELECTRIC WHEEL BRAKES

BACKGROUND OF THE INVENTION

This invention relates in general to devices for actuating trailer electric wheel brakes and in particular to enhancements for trailer electric wheel brake actuators and controllers.

Towed vehicles, such as recreational and utility trailers which are towed by automobiles and small trucks, are commonly provided with electric wheel brakes. The electric wheel brakes generally include a pair of brake shoes which, when actuated, frictionally engage a brake drum. An electromagnet is mounted on one end of a lever to actuate the brake shoes. When an electric current is applied to the electromagnet, the electromagnet is drawn against the rotating brake drum which pivots the lever to actuate the brakes. Typically, the braking force produced by the brake shoes is proportional to the electric current applied to the electromagnet. This electric current can be relatively large. For example, the electric wheel brakes on a two wheeled trailer can draw six amperes of current when actuated and the electric wheel brakes on a four wheeled trailer can draw 12 amperes of current.

Automotive industry standards require that electrically-actuated vehicle wheel brakes be driven against the ground potential of the vehicle power supply. Accordingly, one end of each of the towed vehicle wheel brake electromagnets is electrically connected to the towed vehicle ground and the towed vehicle ground is electrically connected to the towing vehicle ground. The other end of each of the brake electromagnets is electrically connected through either an electric wheel brake actuator or an electric wheel brake controller to the towing vehicle power supply.

Generally, electric wheel brake actuators are manually operated devices which control the magnitude of electric current supplied to the towed vehicle wheel brakes. Various electric brake controllers for towed vehicle electric brakes are known in the art. For example, a variable resistor, such as a rheostat, can be connected between the towing vehicle power supply and the brake electromagnets. Such an actuator is disclosed in U.S. Pat. No. 3,740,691. The towing vehicle operator manually adjusts the variable resistor setting to vary the amount of current supplied to the brake electromagnets and thereby control the amount of braking force developed by the towed vehicle wheel brakes.

It is also known to include an integrating circuit in an electric wheel brake actuator. When the towing vehicle brakes are applied, a signal is sent to the integrating circuit. The integrating circuit generates a continually increasing voltage which is applied to the electric wheel brakes. The longer the towing vehicle brakes are applied, the more brake torque is generated by the actuator. A manually adjustable resistor typically controls the rate of integration. On such actuator is disclosed in U.S. Pat. No. 3,738,710.

Also known in the art are more sophisticated electric brake controllers which include electronic circuitry to automatically supply current to the towed vehicle brake electromagnets which is proportional to the towing vehicle deceleration when the towing vehicle brakes are applied. Such electronic brake controllers typically include a sensing unit which generates a brake control signal corresponding to the desired braking effort. For example, the sensing unit can include a pendulum which is displaced from a rest position when the towing vehicle decelerates and an electronic circuit which generates a brake control signal which is proportional to the pendulum displacement. One such unit is disclosed in U.S. Pat. No. 4,721,344. Alternately, the hydraulic pressure in the towing vehicle's braking system or the pressure applied by the vehicle operator's foot to the towing vehicle's brake pedal can be sensed to generate the brake control signal. An example of a controller which senses the towing vehicle brake pressure to generate the brake control signal is disclosed in U.S. Pat. No. 4,398.252.

Known electronic brake controllers also usually include an analog pulse width modulator. The input of the pulse width modulator is electrically connected to the sensing unit and receives the brake control signal therefrom. The pulse width modulator is responsive to the brake control signal for generating an output signal comprising a fixed frequency pulse train. The pulse width modulator varies the duty cycle of the pulse train in direct proportion to the magnitude of the brake control signal. Thus, the duty cycle of the pulse train corresponds to the amount of braking effort desired.

Electronic brake controllers further include an output stage which is electrically connected to the output of the pulse width modulator. The output stage typically has one or more power transistors which are connected between the towing vehicle power supply and the towed vehicle brake electromagnets. The power transistors, which are usually Field Effect Transistors (FET's), function as an electronic switch for supplying electric current to the towed vehicle brakes. The output stage may also include a drive circuit which electrically couples the output of the pulse width modulator to the gates of the FET's.

The output stage is responsive to the pulse width modulator output signal to switch the power transistors between conducting, or "on", and non-conducting, or "off", states. As the output transistors are switched between their on and off states in response to the modulator output signal, the brake current is divided into a series of pulses. The power supplied to the towed vehicle brakes and the resulting level of brake application are directly proportional to the duty cycle of the modulator generated output signal.

SUMMARY OF THE INVENTION

This invention relates to enhancements for trailer electric wheel brake actuators and controllers.

As explained above, electric wheel brake actuators energize the towed vehicle brakes upon actuation of the towed vehicle brakes. Typically, the stop light switch in the towed vehicle is electrically coupled to the actuator. Upon closure, the stop light switch supplies a signal to the actuator to cause the actuator to energize the towed vehicle brakes. Towing vehicles also include a hazard flasher which causes the vehicle brake lights to flash as a warning of a hazardous condition to other vehicle operators. While hazard flashers are typically used when the towing vehicle is stopped, towing vehicle operators will also actuate the hazard flasher while the towing vehicle is in motion. An example is during operation at a reduced rate of speed, such as during a hill climb. However, because of common wiring, the hazard flasher can supply a signal to the brake actuator which causes the actuator to energize the trailer wheel brakes as the brake lights flash. Accordingly, it would be desirable to prevent operation of the brake actuator when the hazard flasher is operating.

Electric wheel brake actuators also typically include a manual brake control which can be used by the towing vehicle operator to apply the trailer brakes independently of the towing vehicle brakes. If the towing vehicle brakes are then applied, the actuator will respond to the greater of actuator generated brake signal or the manual brake signal. If the actuator gain is set at too high a value, the actuator generated brake signal may overpower the manual brake signal, causing an over application of the trailer wheel brakes. Accordingly, it also would be desirable to disable the portion of the actuator which generates the brake signal when the manual brake control is being used.

The present invention contemplates a device for controlling the electric current supplied to at least one electric wheel brake which includes a brake control signal generator which is adapted to be connected to a vehicle stop light switch. The brake control signal generator is operative to generate a brake control signal. The device also includes an output signal generator which is connected to the brake control signal generator. The output signal generator has an output terminal and is responsive to the brake control signal to generate an output signal at the output terminal which is a function of the brake control signal. The device further includes an electric current controller which is adapted to be connected between a vehicle power supply and the controlled electric wheel brake. The current controller also is coupled to the output terminal of the output signal generator and is responsive to the output signal to control the electric current supplied to the controlled wheel brake as a function of the output signal. A delay circuit is connected to the output signal generator and is operative to delay generation of the brake control signal until a predetermined time period elapses following closing of the stop light switch. The predetermined time period is selected to be greater than the on-time of the vehicle hazard flasher.

In the preferred embodiment, the delay circuit includes a resistor and a delay capacitor adapted to be connected between the stop light switch and ground with the output signal generator coupled to the delay capacitor. Accordingly, the first predetermined time period is a function of a delay time constant defined by the resistor and the delay capacitor. Additionally, the delay circuit includes a device for discharging the delay capacitor when the stop light switch is opened.

The invention also contemplates a manual brake control signal generator and an isolation circuit connected to the manual brake control signal generator and the brake control signal generator. The isolation circuit is operative to disable the brake control signal generator when the manual brake control signal generator is actuated by the vehicle operator.

In the preferred embodiment, the isolation circuit includes a switching device adapted to be connected between the stop light switch and the brake control signal generator. The switching device also is connected to the manual brake control signal generator. The switching device is in a non-conducting mode when the manual brake signal generator is actuated and in a conducting mode when the manual brake control generator is not actuated.

The invention further contemplates a current limiting circuit coupled to the current controller and the output signal generator. The current limiting circuit is operable to modify the output signal to progressively reduce the current supplied to the controlled wheel brake upon the current exceeding a first predetermined threshold. Additionally, the current limiting circuit is operative to disable the output signal generator upon the current being supplied to the controlled wheel brake exceeding a second predetermined threshold which is greater than the first predetermined threshold.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1A:
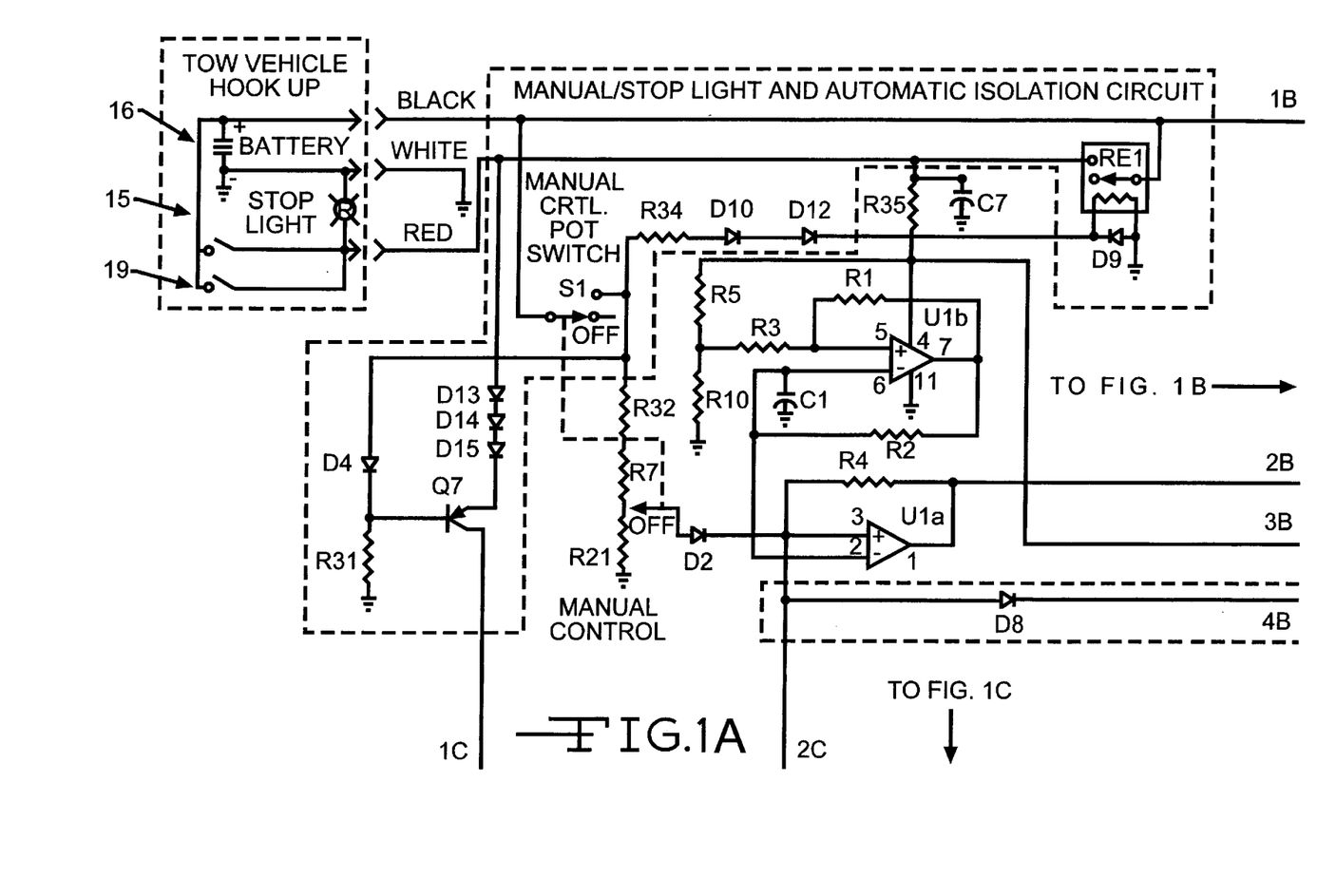
FIG. 1 is a schematic circuit diagram for an electric brake actuator in accordance with the invention.
Figure 1B:
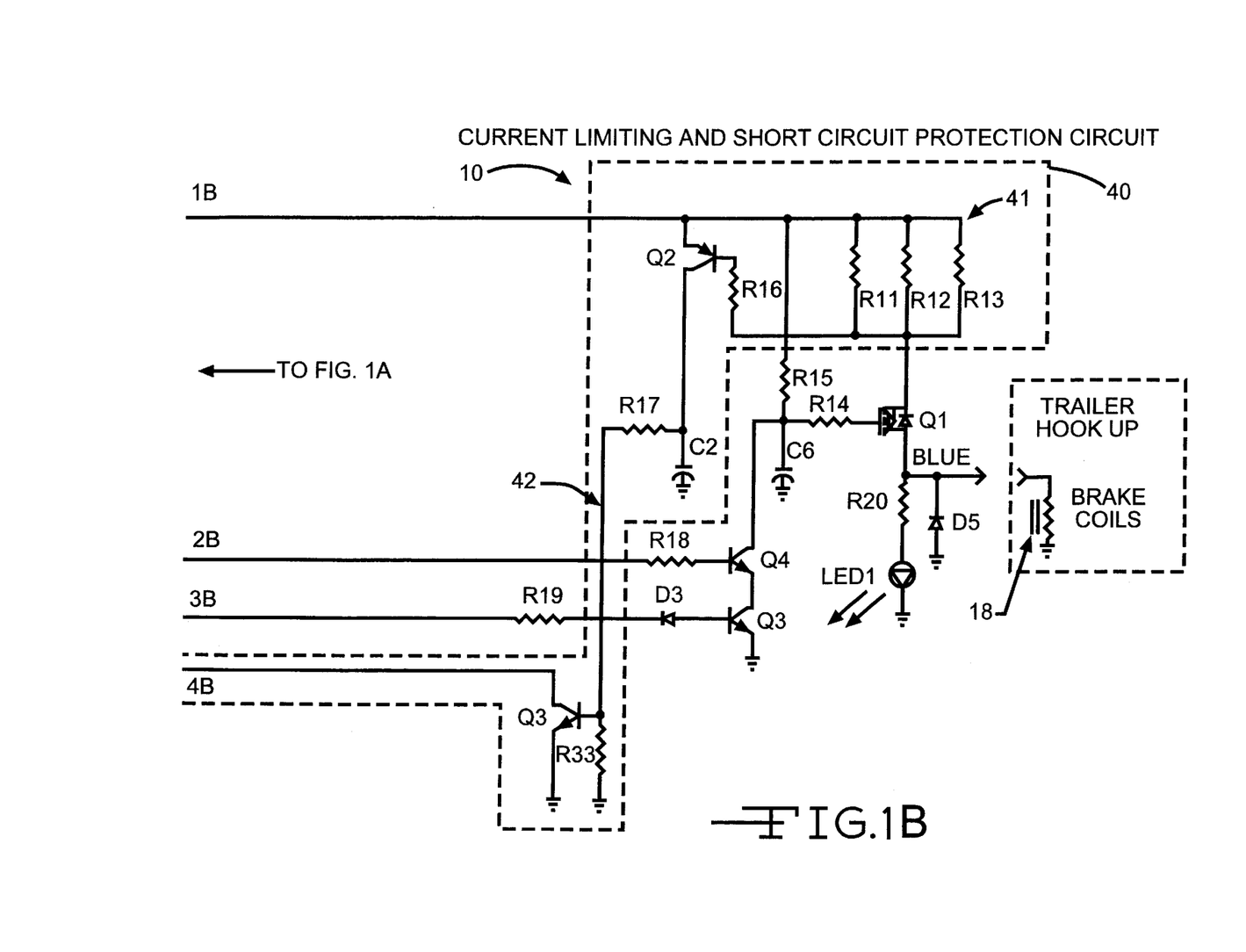
Figure 1C:
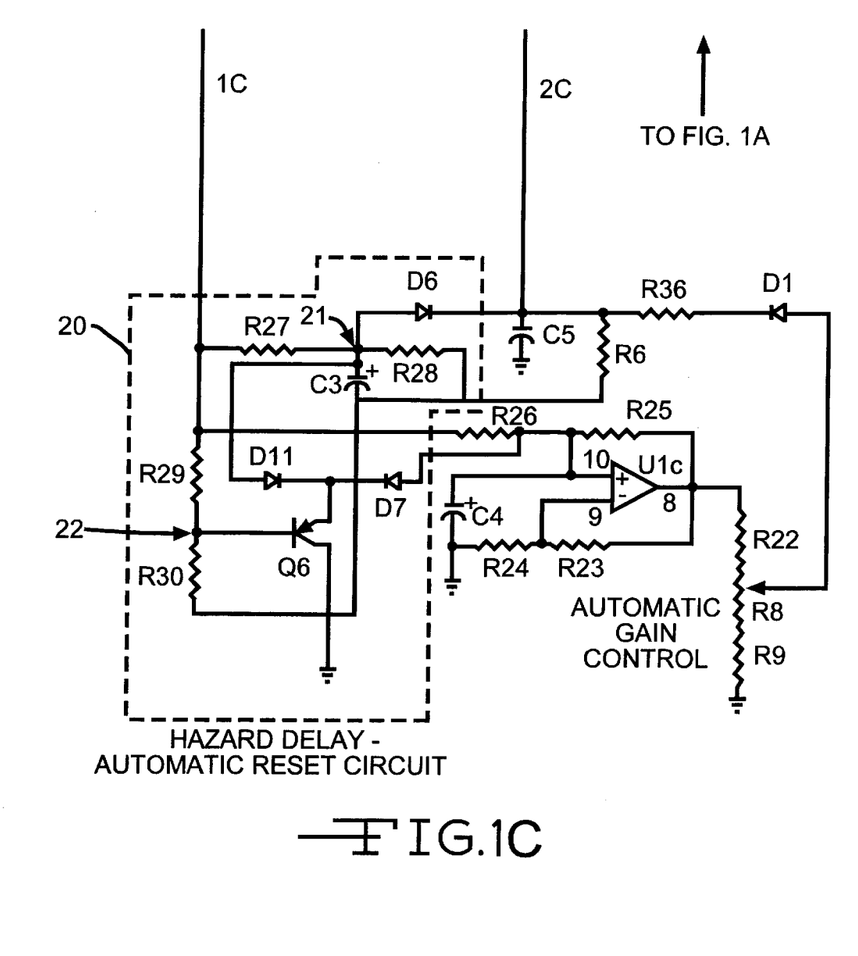

Referring now to the drawings, there is illustrated in FIG. 1 a schematic circuit diagram for an enhanced electric brake actuator 10. The actuator 10 includes an input operational amplifier U1c which generates a brake control signal at its output terminal when the towing vehicle brakes are applied. The input operational amplifier U1c has a positive input terminal which is connected through an input resistor R26 to a towing vehicle stop light switch 15. A ramp capacitor C4, the purpose for which will be explained below, is connected between the positive input terminal of the operational amplifier U1c and ground.

The actuator 10 further includes first and second operational amplifiers, which are identified by the designators U1a and U1b, respectively. The output terminal of the input operational amplifier U1c is connected to a positive input terminal of the first operational amplifier U1a. Thus, the brake control signal is applied to the positive input terminal of the first operational amplifier U1a. The first operational amplifier U1a also has a negative input terminal which is connected to an output terminal of the second operational amplifier U1b. The first and second operational amplifiers U1a and U1b are responsive to the brake control signal exceeding a threshold voltage to generate a PWM output signal at an output terminal of the first operational amplifier U1a. In the preferred embodiment, the threshold voltage is approximately two volts. The PWM output signal has a duty cycle which is proportional to the magnitude of the brake control signal.

The output terminal of the first operational amplifier U1a is connected to the base of a driver transistor Q4. The collector of the driver transistor Q4 is connected to the gate of an output power Field Effect Transistor (FET) Q1. The power FET Q1 is connected between the towing vehicle power supply 16 and the towed vehicle electric brake coils 18 (one shown). An actuation transistor Q5 is connected between the emitter of the driver transistor Q4 and ground. The actuation transistor Q5 has a base terminal connected through an actuation Zener diode D3 and a series connected pair of resistors, R19 and R35, to the towing vehicle stop light switch 15. Closure of the stop light switch 15 upon application of the towing vehicle brakes causes the actuation transistor Q5 to be in a conducting state and thus enables the control of the output FET Q1 by the driver transistor Q4.

When the stop light switch 15 is closed, the ramp capacitor C4 charges through the input resistor R26 with a time constant which is a function of the product of the ramp capacitor C4 and the input resistor R26. Accordingly, as the stop light switch 15 remains closed, an increasing voltage is applied to the positive input terminal of the input operational amplifier U1c. In response to the increasing voltage, the operational amplifier U1c generates an increasing ramped brake control signal which is applied to the positive input terminal of the first operational amplifier U1a. The first and second operational amplifiers U1a and U1b co-operate to generate a PWM output signal having a constant frequency and a ramped duty cycle which is proportional to the magnitude of the brake control signal. The PWM output signal is applied to the base of the driver transistor Q4.

The driver transistor Q4 is responsive to the output signal to switch the power FET Q1 between its non-conducting and conducting states with the duration of the conducting states increasing as the ramp capacitor C4 charges. As the power FET Q1 remains in its conducting state for a longer portion of each switching cycle, the average current supplied to the brake coils 18 increases. Thus, the magnitude of the current supplied to the brake coils 18 increases as a function of the time constant determined by the product of the input resistor R26 and ramp capacitor C4.

The towing vehicle also includes a hazard flasher switch 19, which is connected in parallel across the stop light switch 15. As explained above, the operation of the towing vehicle's hazard flasher switch 19 can cause false actuation of the towed vehicle brakes. Accordingly, the present invention contemplates including a hazard delay and automatic reset circuit, which is shown in FIG. 1 within the dashed lines labeled 20, in the actuator circuit 10. The hazard delay circuit 20 includes a delay capacitor C3 which has a first end connected to a center tap of a first voltage divider 21 and a second end connected to ground. The first end of the delay capacitor C3 also is connected through a coupling diode D6 to the positive input terminal of the first operational amplifier U1a. The first voltage divider 21, which includes a pair of resistors, R27 and R28, is connected between the collector of an isolation transistor Q7 and ground. The isolation transistor Q7 has an emitter connected through a plurality of diodes, D13, D14 and D15, to the stop light switch 15. As will be explained below, during normal operation of the actuator 10, the isolation transistor Q7 is in its conducting state.

The hazard delay circuit 20 also includes a second voltage divider 22, which includes a pair of resistors, R29 and R30, connected between the collector of the isolation transistor Q7 and ground. The center tap of the second voltage divider 22 is connected to the base of a discharge transistor Q6. Thus, the second voltage divider 22 functions to bias the discharge transistor Q6. The emitter of the discharge transistor Q6 is connected through a first discharge diode D11 to the center tap of first voltage divider 21 and thereby to the non-grounded first end of the delay capacitor C3. The emitter of the discharge transistor Q6 also is connected through a second discharge diode D7 to the positive input terminal of the input operational amplifier U1c and thereby to the non-grounded side of the ramp capacitor C4.

Figure 2:
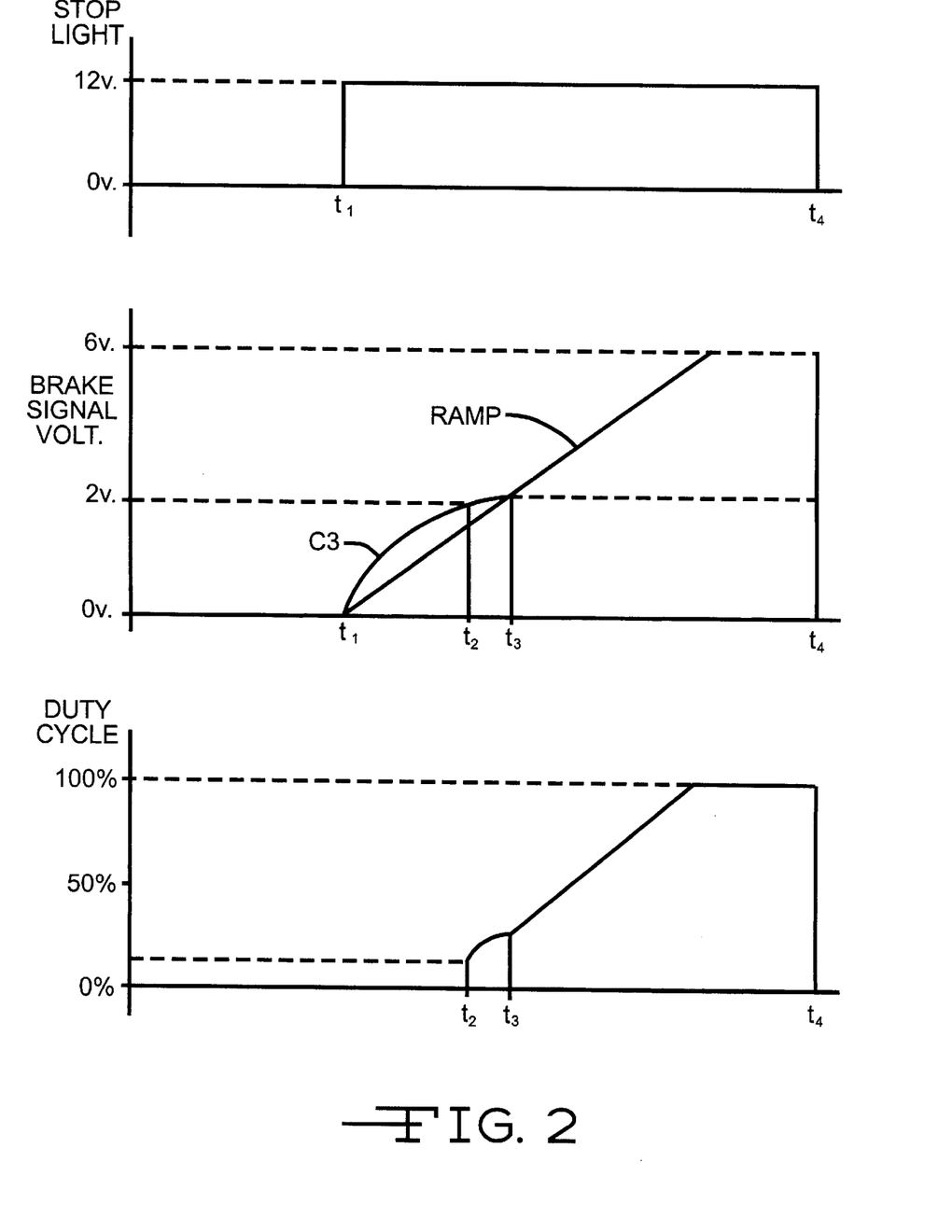
FIG. 2 is a graph of selected voltages within the actuator shown in FIG. 1 during a brake application.

The operation of the hazard delay and automatic reset circuit 20 will now be explained. Selected voltages within the actuator 10 during a normal brake actuation, without the hazard flasher in operation, are illustrated in FIG. 2. Before actuation of the stop light switch 15, both the delay capacitor C3 and the ramp capacitor C4 are discharged. Also, the base of the discharge transistor Q6 is at ground potential, which causes the discharge transistor Q6 to be in its conducting state. Accordingly, when the stop light switch 15 is closed, as shown at $t_1$ in the top curve in FIG. 1, the power supply voltage is applied to the second voltage divider 22. A portion of the power supply voltage appears on the base of the discharge transistor Q6 which causes the transistor Q6 to switch to its non-conducting state, blocking current flow through the first and second discharge diodes D11 and D7. The delay capacitor C3 proceeds to charge through the resistor R27 to a voltage level determined by the ratio of the resistors in the first voltage divider 21, as shown in the curve labeled "C3" in FIG. 2. Simultaneously with the charging of the delay capacitor C3, the ramp capacitor C4 charges through the input resistor R26 causing the input operational amplifier U1c to generate a ramped brake control signal, as shown by the curve labeled "RAMP" in FIG. 2. Both the voltage across the delay capacitor C3 and the ramped brake control signal, RAMP, generated by the input operational amplifier U1c are applied to the positive input terminal of the first operational amplifier U1a. As can be seen in FIG. 2, initially, the voltage across C3 increases at a faster rate that the brake control signal, RAMP. Accordingly, the first operational amplifier is initially responsive to the voltage across the delay capacitor C3. When the voltage across the delay capacitor C3 increases to the predetermined threshold level, which occurs at $t_2$ in FIG. 2, the first operational amplifier U1a begins to generate the PWM output signal which causes actuation of the towed vehicle brakes.

In the preferred embodiment, the curve labeled C3 initiates a PWM output signal having a duty cycle of 8 to 12 percent, as illustrated in the bottom curve in FIG. 2. The reduced duty cycle provides a "soft turn-on" for the towed vehicle brakes. At $t_3$, the ramp brake control signal generated by the input operational amplifier U1c exceeds the voltage across the delay capacitor C3 and causes the duty cycle of the PWM output signal to ramp up to a maximum of 100 percent, which is reached at $t_4$. The duty cycle remains at 100 percent until the stop light switch 15 is released at $t_5$. The slope of the ramp brake control signal, RAMP, generated by the input operational amplifier U1c is adjustable with the Automatic Gain Control (AGC), R8. Thus, under normal operating conditions, the delay capacitor C3 and ramp capacitor C4 function to slightly delay the application of and provide a soft turn-on to the towed vehicle brakes.

Figure 3:
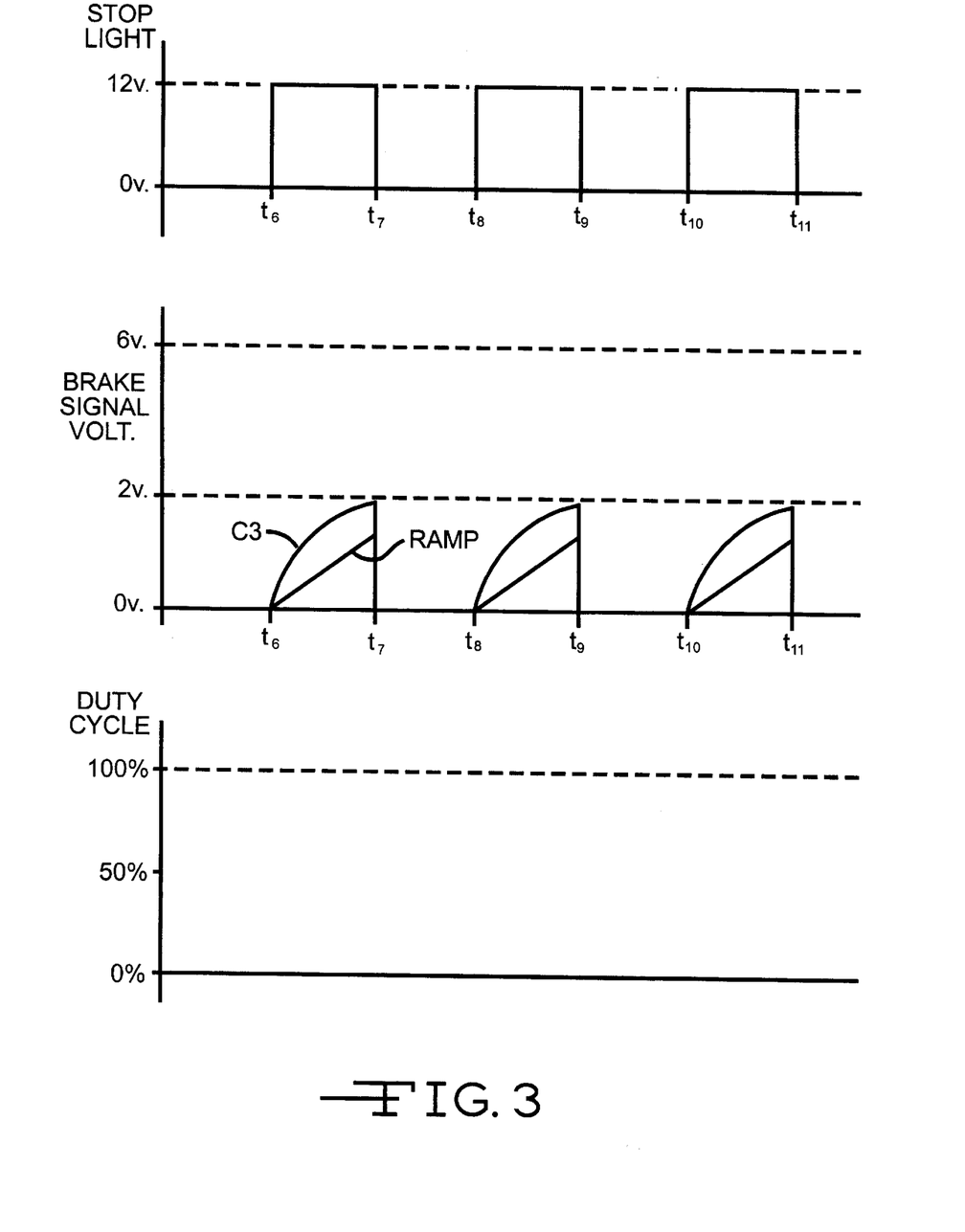
FIG. 3 is a graph of selected voltages within the actuator shown in FIG. 1 during operation of the towing vehicle hazard flasher.

Selected voltages within the actuator 10 with the hazard flasher actuated are shown in FIG. 3. When the hazard flasher of the towing vehicle is actuated, the hazard flasher switch 19 is periodically moved between open and closed positions. Thus, the hazard flasher switch 19 closes at $t_6$ and opens at $t_7$ in FIG. 3. Accordingly, the input voltage to the actuator 10 consists of a pulse train, as illustrated by the stop light voltage curve shown at the top of FIG. 3. The time constant for the delay RC circuit comprising R27 and C3 is selected such that the difference between $t_1$ and $t_2$ is slightly greater than the on-time of the towing vehicle hazard flasher switch 19, which is the difference between $t_6$ and $t_7$. In the preferred embodiment, the time constant provides a difference between $t_1$ and $t_2$ which is approximately a half second. The ramp RC circuit comprising R26 and C4 has a time constant which is longer than the delay RC time constant. Accordingly, if the input voltage to the actuator 10 is generated by the hazard flasher, the input voltage to the actuator 10 will go to zero before the delay capacitor C3 charges sufficiently to initiate generation of a PWM output signal, as shown in the middle and lower curves in FIG. 3.

When the actuator input voltage returns to zero, the base of the discharge transistor Q6 is pulled to ground, causing the discharge transistor Q6 to switch to its conducting state. When the discharge transistor Q6 begins to conduct, the delay capacitor C3 begins discharging through the first discharge diode D11 and the ramp capacitor C4 begins discharging through the second discharge diode D7 to prepare the circuit 20 for the next on-cycle of the hazard flasher. It will be appreciated that the discharge transistor Q6 and discharge diodes D11 and D7 also begin to conduct to discharge the delay and ramp capacitors C3 and C4 upon the stop light switch 15 opening at the end of a normal braking cycle.

As explained above, the actuator 10 includes a manual brake control which can be used by the towing vehicle operator to apply the trailer brakes independently of the towing vehicle brakes. The manual brake control includes a potentiometer R7 which is connected between the towing vehicle power supply 16 and ground. The slider tap of the potentiometer R7 is connected to the positive input terminal of the first operational amplifier U1a. Movement of the potentiometer R7 from its "OFF" position generates a manual brake control signal which is applied to the first operational amplifier U1a. However, if the automatic gain control of the input operational amplifier U1c is set too high, an application of the towing vehicle brakes could cause the input operational amplifier U1c to generate a greater than needed brake control signal. Accordingly, the present invention further contemplates that the actuator 10 includes a manual stop light and automatic isolation circuit, which is labeled 30 in FIG. 1.

As shown in FIG. 1, the manual brake control signal potentiometer R7 is ganged to a manual control potentiometer switch S1. In the preferred embodiment, the potentiometer R7 includes a return spring which urges the potentiometer slider to the OFF position. When the towing vehicle operator manually moves the slider from the OFF position, the switch S1 is closed. One side of the switch S1 is connected to the vehicle power supply 16. The normally open contact of the switch S1 is connected through the coil of a relay RE1 to ground. The relay RE1 includes a set of normally open contacts connected between the power supply 16 and the stoplight lamp. The normally open contact of the switch S1 is connected to the base of the isolation transistor Q7, the second operational amplifier U1b and the vehicle stop lights (one shown).

The operation of the manual stop light and automatic isolation circuit 30 will now be described. During normal operation, the switch S1 is open, causing the base of the isolation transistor Q7 to be at ground potential. Accordingly, the isolation transistor Q7 is normally in its conducting state which allows power to flow from the stop light switch 15 to the delay and ramp capacitors, C3 and C4. However, upon movement of the slider of the manual brake control signal potentiometer R7 to generate a manual brake control signal, the switch S1 is closed. When the switch S1 closes, a voltage is applied to the base of the isolation transistor Q7 which causes the transistor to switch to its non-conducting state. Also, the relay contacts close to illuminate the stop light lamp. With the isolation transistor Q7 in a non-conducting state, the delay and ramp capacitors, C3 and C4, are isolated from the stop light switch 15. Accordingly, actuation of the stop light switch 15 when the manual control is in use will not cause the input operational amplifier U1c to generate a brake control signal. As described above, closure of switch S1 supplies power to the second operational amplifier U1b which enables the generation of a PWM output signal from the first operational amplifier U1a in response to the manual brake control signal. As described above, power also is supplied to illuminate the towing and towed vehicle stop lights (one shown).

The actuator 10 also includes an output current limiting and short circuit protection circuit 40. The circuit 40 includes a current sensor 41 comprising a plurality of low valued resistors which are connected in parallel. In the preferred embodiment, three 0.10 ohm resistors, which are labeled R11, R12 and R13 in FIG. 1, are connected in parallel; however, more or less resistors can be utilized. The current sensor 41 is connected between the power supply 16 and the source terminal of the output power FET Q1. As described above, the power output FET Q1 has a drain terminal connected through the coils 18 (one shown) of the electric wheel brakes to ground. The end of the current sensor 41 connected to the source terminal of the FET Q1 is connected thorough a resistor R16 to a base terminal of a first sensor transistor Q2. The first sensor transistor Q2 has an emitter terminal connected to the power supply 16 and a collector terminal connected through a sensor capacitor C2 to ground.

The collector terminal of the first sensor transistor Q2 also is connected to a bias circuit 42 comprising a pair of resistors, labeled R17 and R33, connected in series. The center tap of the bias circuit 42 is connected to the base of a second sensor transistor Q3. The emitter of the second sensor transistor Q3 is connected to ground while the collector of the second sensor transistor Q3 is connected through a blocking diode D8 to the positive input terminal of a first operational amplifier U1a. The blocking diode D8 blocks current from flowing back to the first operational amplifier input terminal from the current limiting circuit 40.

The operation of the current limiting circuit 40 will now be described. When the output FET Q1 conducts, a load current flows through the current sensor 41. The load current causes a voltage to appear across the current sensor 41 which is directly proportional to the magnitude of the load current. When the voltage across the current sensor 41 exceeds a first predetermined threshold, the first transistor Q2 begins to conduct which causes the sensor capacitor C2 to begin to charge. It will be appreciated that the load current flowing through the output FET Q1 fluctuates as the PWM output voltage switches the FET Q1 between its conducting and non-conducting states. Accordingly, the current flowing to the sensor capacitor C2 also fluctuates. The sensor capacitor C2 smoothes the fluctuations and charges to a voltage which is proportional to the average load current supplied to the brake coils 18. The voltage across the sensor capacitor C2 is applied to the base of the second sensor transistor Q3, which turns on and thereby reduces the brake control signal applied to the positive input terminal of the first operational amplifier U1a. The reduced brake control signal causes, in turn, a reduction in the duty cycle of the PWM output voltage. The reduced duty cycle reduces the on time of the output FET Q1 and, thereby, reduces the load current supplied to the electric trailer brake coils 18.

If the current supplied to the trailer brake coils 18 further increases, the voltage across the current sensor 41 also increases, progressively turning on the first and second sensor transistors Q2 and Q3 and thereby progressively reducing the duty cycle of the PWM output voltage. Upon the load current reaching a second predetermined threshold, the second transistor Q3 becomes fully conducting, providing a direct connection between the positive input terminal of the first operational amplifier U1a and ground. When this occurs, the brake control signal is shunted to ground and the operational amplifier PWM output signal goes to zero, turning off the output FET Q1 and providing short circuit protection for the actuator 10. In the preferred embodiment, the sensor transistors Q2 and Q3 in the current limiting circuit 40 begin conducting when the brake current reaches 13.5 to 18 amps and complete shut off of the output FET Q1 occurs when the output current reaches approximately 20 to 24 amps. The current values can be adjusted by selecting other values for the sensor capacitor C2 and/or the resistors R17 and R33.

Upon shut off of the output FET Q1, the first sensor transistor Q2 also is shut off as the current flow though the current sensor 41 stops. The sensor capacitor C2 then begins to discharge through the bias resistors R17 and R33. As the sensor capacitor C2 discharges, the conduction of the second sensor transistor Q3 is progressively reduced, allowing the voltage at the positive input terminal to the first operational amplifier U1a to increase. In the preferred embodiment, the time constant for the combination of the sensor capacitor C2 and the resistors R17 and R33 is selected such that, for brake currents in excess of 20 amps, the sensor capacitor C2 will maintain a sufficiently high charge to keep the brake current at zero for three cycles of the PWM signal. Thus, the actuator off-time is increased to approximately 11 milliseconds from a typical off-time of approximately 3 milliseconds in prior art actuators. As a result, the heating of the power FET Q1 is greatly reduced. The invention also contemplates using power FET's having a lower internal resistance than in prior art controllers to further reduce heating and associated power losses.

The invention further contemplates that the brake actuator 10 includes a plurality of the voltage regulation diodes labeled D13, D14 and D15 which are connected between the stop light switch 15 and the positive input terminal of the input operational amplifier U1c. The regulation diodes D13 thorough D15 reduce the input voltage supplied to the actuator 10 from the stop light switch and compensate for variation of the towing vehicle alternator voltage. When conducting, the voltage across each of the regulation diodes is fixed by the diode forward emf and does not vary with the supplied voltage as the voltage across a resistive voltage divider would. While three regulation diodes are shown in FIG. 1, it will be appreciated that the invention also can be practiced with more or less diodes.

The invention further contemplates stabilizing the voltages within the actuator and controller circuit 10 with selected use of one percent tolerance resistors. Such resistors do not vary with temperature changes or the age of components. In the preferred embodiment, one percent resistors are utilized for the resistors R27 and R28 in the first voltage divider 21 to assure that the actuator 10 has a consistent turn on duty cycle for the PWM output signal.

Figure 4A:
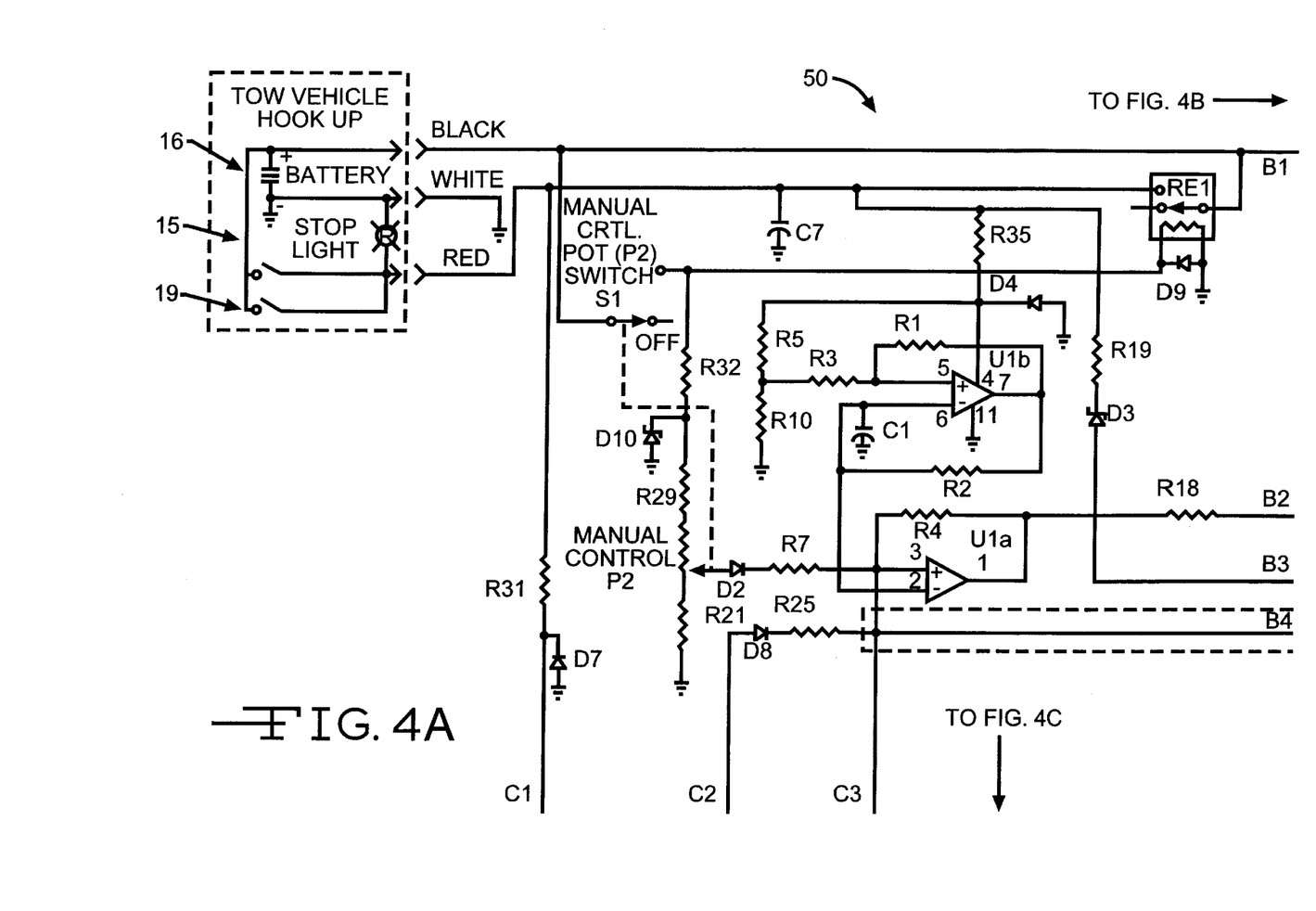
FIG. 4 is a schematic circuit diagram for an electric brake controller in accordance with the invention.
Figure 4B:
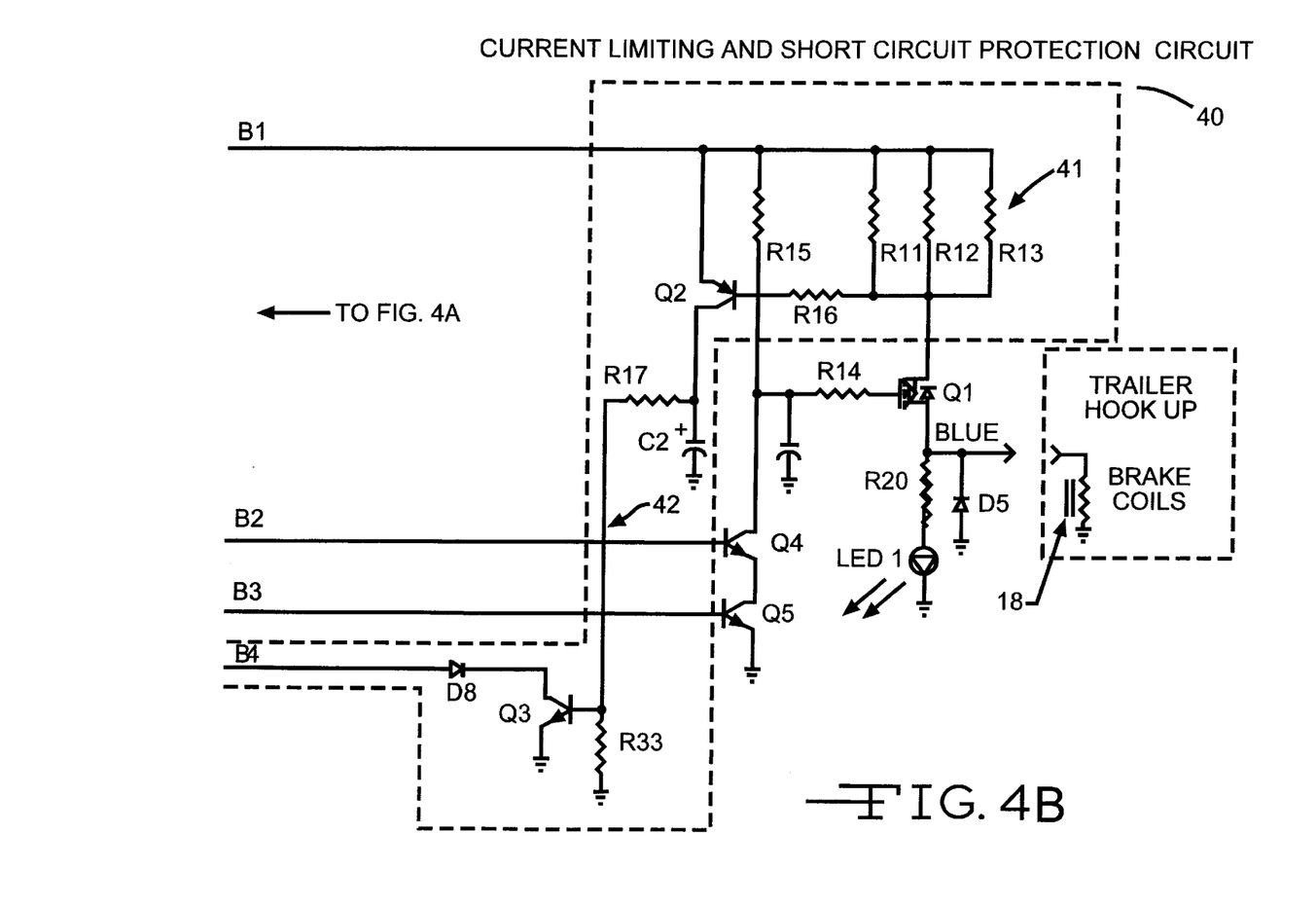
Figure 4C:
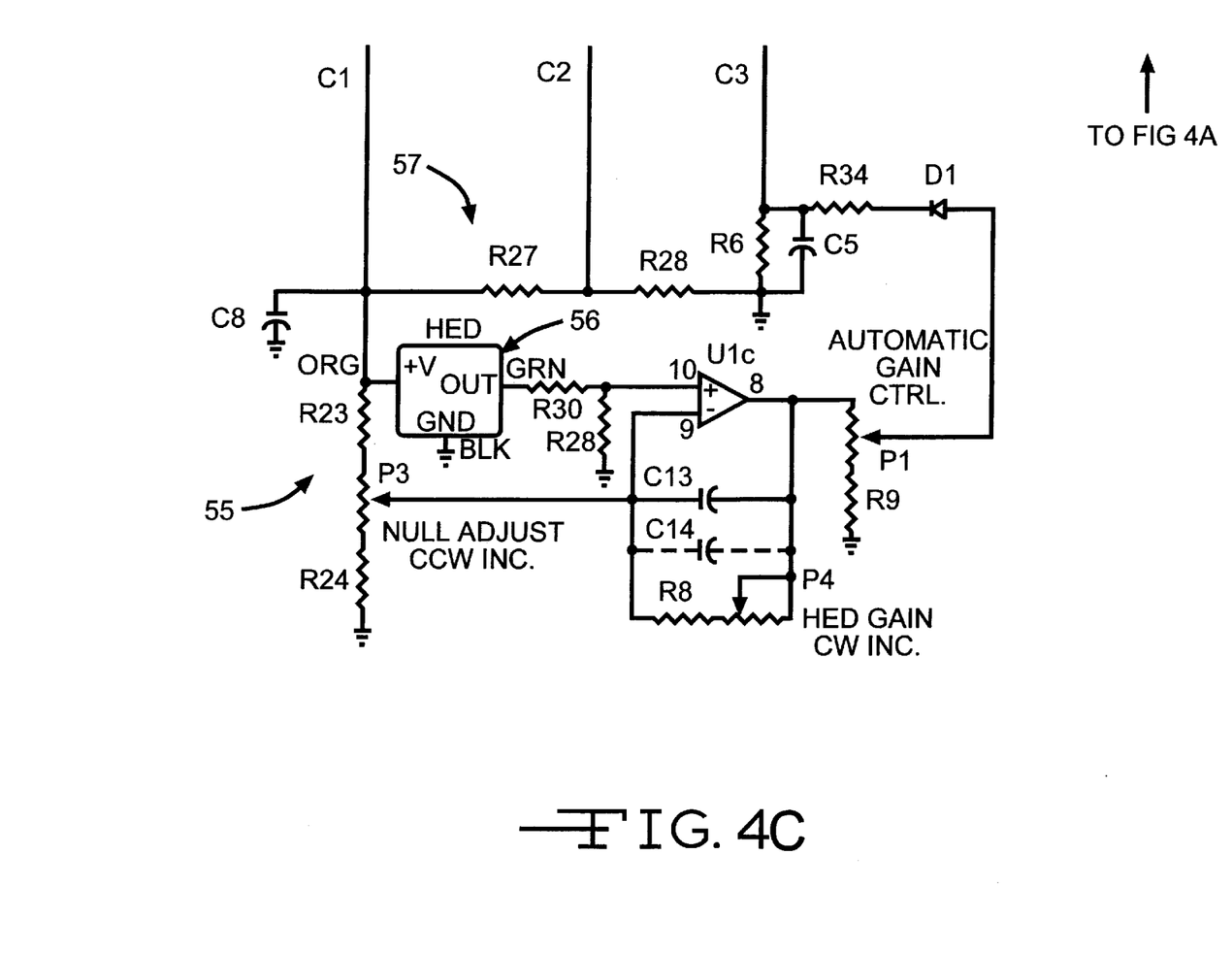

The invention also contemplates utilizing the output limiter and short circuit protection circuit 40 in an enhanced electric brake controller 50, as illustrated in FIG. 4. Components shown in FIG. 4 which are similar to components shown in FIG. 1 have the same numerical designators. The electric brake controller 50 is similar to the actuator 10, but includes a brake control signal generator 55. In the preferred embodiment shown in FIG. 4, the brake control signal generator 55 includes a pendulum device (not shown) which co-operates with a Hall Effect Device (HED) 56 to generate a brake control signal which is proportional to the deceleration of the towing vehicle. The brake control signal is applied to the positive input terminal of the first operational amplifier U1a. As described above, the first operational amplifier U1a cooperates with a second operational amplifier U1b to generate a PWM output signal for controlling the output power FET Q1. The PWM output signal has a duty cycle which is a function of the brake control signal.

As shown in FIG. 4, the enhanced controller 50 includes the output limiter and short circuit protection circuit 40 described above. The protection circuit 40 monitors the current flowing through the output FET Q1 and is operable to reduce the duty cycle of the PWM output signal as the current increases above a predetermined first threshold. The protection circuit 40 is further operable to turn off the output FET Q1 if the current exceeds a second predetermined threshold. Similar to the actuator 10 described above, the controller off-time is increased to approximately 11 milliseconds from a typical off-time of approximately 3 milliseconds in prior art cintrollers.

The present invention contemplates use of zener diodes to regulate voltages in the brake controller circuit 50 shown in FIG. 4. A first zener diode, which is labeled D4, is connected between the voltage input terminal of the second operational amplifier U1b and ground. The first zener diode D4 functions to regulate the voltage supplied to the operational amplifier and thus prevent overloading the operational amplifier while assuring consistent operation of thereof. A second zener diode, which is labeled D7, is connected between the voltage input terminal of the HED 56 and ground. The second zener diode D7 functions to regulate the voltage supplied to the HED 56 and thus prevent overloading the HED 56 while assuring generation of consistent automatic brake control signals. A third zener diode, which is labeled D10, is connected between the voltage input terminal of the manual brake control signal potentiometer P2 and ground. The third zener diode D10 functions to regulate the voltage supplied to the potentiometer P2 and thus prevent overloading the potentiometer P2 while assuring generation of consistent manual brake control signals. A fourth zener diode D3 is connected between the stop light switch 15 and the base of the actuation transistor Q5. The fourth zener diode D3 provides a threshold voltage which must be exceed before the output power FET Q1 can be turned on. It will be noted that the fourth zener diode D3 also is included in the improved actuator circuit 10 shown in FIG. 1. Additionally, the zener diodes, D3, D4, D7 and D10 are selected to have a positive temperature coefficient to prevent a temperature increase from decreasing the duty cycle of the PWM output signal.

The invention also contemplates the inclusion of a damping capacitor C13 which is connected between the output terminal and the negative input terminal of the input operational amplifier U1c. The damping capacitor C13 slows changes in the automatic brake control signal to prevent false brake applications caused by road surface irregularities displacing the pendulum device. In the preferred embodiment, the damping capacitor C13 is a 1.0 micro-farad capacitor. Damping can be further increased by connecting an optional second damping capacitor C14 in parallel to the damping capacitor C13, as shown in FIG. 4.

The controller 50 further includes a voltage divider 57 which supplies a minimum brake control signal to the positive input terminal of the first operational amplifier U1a. The voltage divider 57 includes a pair of resistors R27 and R28 which are connected between the stop light switch 15 and ground. When the stop light switch 15 is closed, a small voltage is applied to the positive input terminal of the first operational amplifier U1a to actuate the trailer wheel brakes before the towing vehicle has decelerated sufficiently for the pendulum device 55 and HED 56 to generate an automatic brake control signal. In the preferred embodiment, the minimum brake control signal is equivalent to a ten percent brake application; however, by adjusting the values of the resistors R27 and R28, other amounts of brake application can be provided, such as a six percent initial application. Also in the preferred embodiment, one percent resistors are utilized for the resistors R27 and R28 in the voltage divider 57 to assure that the controller 50 has a consistent turn on duty cycle for the PWM output signal.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, the isolation circuit 30 included in the actuator 10 shown in FIG. 1 also can be included in the brake controller 50 illustrated in FIG. 4.

What is claimed is:

1. An electric brake actuator for controlling the electric current supplied to at least one controlled electric wheel brake comprising:

a brake control signal generator which is adapted to be connected to a vehicle stop light switch, said brake control signal generator operable to generate a brake control signal;

an output signal generator which is connected to said brake control signal generator, said output signal generator being responsive to said brake control signal to supply an electric current to the controlled wheel brake which is a function of said brake control signal;

a delay circuit connected to said output signal generator which is operative to delay operation of said output signal generator until a first predetermined time period elapses following a closure of the vehicle stop light switch, said delay circuit including a resistor and a delay capacitor adapted to be connected between said stop light switch and ground, said output signal generator being coupled to said delay capacitor with said first predetermined time period being a function of a delay time constant defined by said resistor and said delay capacitor, said first predetermined time period being greater than the on-time of a vehicle hazard flasher; and a device for discharging said delay capacitor when said stop light switch is opened, said device for discharging said delay capacitor including a discharge transistor connected between said capacitor and ground, said discharge transistor being adapted to be coupled to said stop light switch, said discharge transistor being in a non-conducting state when said stop light switch is closed and in a conducting state when said stop light switch is in a non-conducting state and said brake control signal generator supplying a ramped brake control signal to said output signal generator after a second predetermined time elapses following closure of said brake light switch, where said second predetermined time period is greater than said first predetermined time period.

2. A device for controlling the electric current supplied to at least one controlled electric wheel brake comprising:

a brake control signal generator which is adapted to be connected to a vehicle stop light switch, said brake control signal generator operable to generate a brake control signal;

an output signal generator having an input terminal which is connected to said brake control signal generator, said output signal generator also having an output terminal, said output signal generator responsive to said brake control signal to generate an output signal at said output terminal which is a function of said brake control signal;

an electric current controller which is adapted to be connected between a vehicle power supply and the controlled electric wheel brake, said current controller coupled to said output terminal of said output signal generator, said current controller responsive to said output signal to control said electric current as a function of said output signal; and an output current limiting circuit coupled to said current controller and said output signal generator, said current limiting circuit including at least one current sensing resistor having a first end connected to said current controller and a second end adapted to be connected to said power supply, said current sensing resistor coupled to a first current limiting transistor, said current limiting circuit further including a current limiting capacitor connected between said first current limiting transistor and ground, said current limiting capacitor coupled to a second current limiting transistor with said second current limiting transistor coupled to said output signal generator, said current limiting circuit operable to modify said output signal to progressively reduce said current supplied to said controlled wheel brake upon said current exceeding a first predetermined threshold.

3. A device according to claim 2 wherein said output current limiting circuit is operative to disable said output signal generator upon said current supplied to said controlled wheel brake exceeding a second predetermined threshold, said second predetermined threshold being greater than said first predetermined threshold.

4. A device according to claim 2 further including at least one diode adapted to be connected between said vehicle stop light switch and said brake control signal generator whereby said diode regulates the magnitude of the voltage supplied to said brake control signal generator.

5. A device according to claim 2 further including a voltage divider adapted to be connected between said stop light switch and ground, said voltage divider coupled to said output signal generator, said voltage divider including resistors having tolerances which are less than ten percent whereby said output signal generator has a consistent turn-on characteristic.

6. A device for controlling the electric current supplied to at least one controlled electric wheel brake comprising:

a brake control signal generator which is adapted to be connected to a vehicle stop light switch, said brake control signal generator operable to generate a brake control signal;

an output signal generator having an input terminal which is connected to said brake control signal generator, said output signal generator also having an output terminal, said output signal generator responsive to said brake control signal to generate an output signal at said output terminal which is a function of said brake control signal;

an electric current controller which is adapted to be connected between a vehicle power supply and the controlled electric wheel brake, said current controller coupled to said output terminal of said output signal generator, said current controller responsive to said output signal to control said electric current as a function of said output signal; and an output current limiting circuit coupled to said current controller and said output signal generator, said current limiting circuit including at least one current sensing resistor connected between said vehicle power supply and said current controller, said current sensing resistor coupled to a first sensor transistor, a sensing capacitor connected between said first sensing transistor and ground, said sensing capacitor coupled to a second sensing transistor, said second sensing transistor coupled to said output signal generator, said first sensor transistor being progressively turned on as the current flowing though said sensing resistor increases above a first predetermined threshold, said sensing capacitor charging as said first sensing transistor conducts, the voltage across said sensing capacitor causing said second sensing transistor to turn on and progressively reduce said brake control signal supplied to said output signal generator, said output current limiting circuit also being operative to disable said output signal generator upon said current being supplied to said controlled wheel brake exceeding a second predetermined threshold, said second predetermined threshold being greater than said first predetermined threshold.

7. A device according to claim 6 wherein the device is an electric brake actuator and said brake control signal generator supplies a ramped brake control signal to said output signal generator.

8. A device according to claim 6 wherein the device is an electric brake controller and said brake control signal generator generates a brake control signal proportional to the deceleration of the vehicle.

* * * * *